(12) United States Patent
Calvin et al.

(10) Patent No.: US 7,040,886 B2
(45) Date of Patent: May 9, 2006

(54) APPARATUS AND METHOD FOR HANDLING LENS CARRIERS

(75) Inventors: Olin Calvin, Jacksonville, FL (US); Gary S. Hall, Jacksonville, FL (US); Michael Widman, Jacksonville, FL (US); Richard W. Abrams, Jacksonville, FL (US); David Dolan, Jacksonville Beach, FL (US)

(73) Assignee: Johnson & Johnson Vision Care, Inc.

( * ) Notice: Subject to any disclaimer, the term of this patent is extended or adjusted under 35 U.S.C. 154(b) by 350 days.

(21) Appl. No.: 09/923,562

(22) Filed: Aug. 9, 2001

(65) Prior Publication Data

US 2003/0031746 A1    Feb. 13, 2003

(51) Int. Cl.
 *B29D 11/00*    (2006.01)
(52) U.S. Cl. .................. 425/454; 425/174.4; 425/454; 425/808; 414/222.04; 414/222.1; 414/222.11
(58) Field of Classification Search ............. 425/174.4, 425/453, 454, 808; 264/1.38; 414/222.04, 414/222.08, 222.1, 222.11
See application file for complete search history.

(56) References Cited

U.S. PATENT DOCUMENTS 5,578,331 A * 11/1996 Martin et al. ............... 425/445
5,607,642 A *  3/1997 Lepper et al. ................ 422/62
5,895,192 A *  4/1999 Parnell et al. .......... 414/225.01
5,965,172 A * 10/1999 Wang et al. ................. 425/186
6,220,845 B1    4/2001 Martin et al.

* cited by examiner

*Primary Examiner*—Donald Heckenberg
(74) *Attorney, Agent, or Firm*—Joseph Kincart

(57) ABSTRACT

Novel methods and apparatus are disclosed for handling carriers for soft contact lenses in a lens manufacturing system. In accordance with a first aspect of the invention, article handling devices are located beneath a pre-cure station and a curing station of the system to move lens carriers within those stations. As a result of locating these devices beneath these stations, the desired movement of the carriers can be achieved without increasing the footprint of the station. Pursuant to a second aspect of the invention, a complete set of assemblies is provided for moving a multitude of lens carriers into, through, and out from the pre-cure station and the curing station. This set of assemblies accomplishes this movement in a completely automated, high speed, mass production basis. In accordance with a third aspect of the invention, the curing station is provided with an intelligent buffer. This buffer allows the lens carriers to accumulate in the curing station, and then discharges the carriers from the station in an ordered manner at the appropriate time. This enables the output or throughput of the curing station to be controlled or adjusted to accommodate changing conditions or circumstances occurring in the manufacturing system downstream of the curing station.

13 Claims, 15 Drawing Sheets

APPARATUS AND METHOD FOR HANDLING LENS CARRIERS

BACKGROUND OF THE INVENTION

1. Field of the Invention

This invention generally relates to the manufacture of soft contact lenses using a polymerizable monomer or monomer mixture. More specifically, the invention relates to methods and apparatus for moving lens carriers in such a manufacturing process. Even more specifically, the invention relates to such methods and apparatus that are particularly well suited for moving the lens carriers through pre-curing and curing stations.

2. Prior Art

Over the last several years, systems have been successfully developed for the automated, mass production of soft contact lenses using a direct molding process. One such system is disclosed in U.S. Pat. No. 6,220,845, the entire disclosure of which is hereby incorporated herein in its entirety by reference.

Generally, in the system disclosed in U.S. Pat. No. 6,220,845, each lens is formed by sandwiching a monomer between back and front mold halves. The monomer is polymerized, thus forming a lens that is then removed from the mold halves, further treated, and packaged for consumer use. In order to polymerize the monomer, it has been found advantageous to pass the monomer through both a pre-cure and a curing step.

In the pre-cure step, the mold halves are held together under pressure while the polymerization is begun. Typically, the monomer composition includes initiators that work upon exposure to ultraviolet or visible radiation; and, in the pre-cure step, while the mold halves are held together, the composition is exposed to such radiation of an intensity and duration effective to initiate polymerization. After the pre-cure step, the monomer is again exposed to ultraviolet or visible radiation in a cure step in which the polymerization is permitted to proceed to completion.

More than one lens can be cured at a time, and the throughput of the lens manufacturing process can be increased by increasing the number of lenses being cured at the same time. Simply increasing the number of lenses being cured at one time is complicated, however, by several factors. For example, as this number increases, the size of the area or areas needed for the pre-cure and curing also tends to increase, and other design constraints or considerations may limit the size of this area or areas. In addition, as the number of lenses that are in the pre-cure and cure areas increases, the design and operation of the article handling apparatus used to move all of these lenses into, through, and out of these areas may become excessively complicated.

SUMMARY OF THE INVENTION

An object of this invention is to provide pre-cure and curing stations, in a system for molding soft contact lenses, that are compact and yet can also handle a large volume of lenses.

Another object of the present invention is to improve methods and apparatus for handling lens carriers in pre-cure and curing station of a lens manufacturing system.

A further object of the invention is to locate article handling equipment beneath the floors of pre-cure and curing stations of a contact lens manufacturing system, and thereby to reduce the required size of the footprint of the floors while still being able to move the lenses through the stations in a highly effective and efficient manner.

Another object of the invention is to provide a curing station, in a system for molding soft contact lenses, with an intelligent buffer.

A still another object of this invention is to hold a variable number of contact lenses in a curing station of a soft contact lens manufacturing system, to help the system accommodate temporary interruptions, or other changes, in the operation of other stations or subsystems of the system.

These and other objectives are attained with novel methods and apparatus for handling carriers for soft contact lenses in a lens manufacturing system. In accordance with a first aspect of the invention, article handling devices are located beneath a pre-cure station and a curing station of the system to move lens carriers within those stations. As a result of locating these devices beneath these stations, the desired movement of the carriers can be achieved without increasing the footprint of the station. Pursuant to a second aspect of the invention, a complete set of assemblies is provided for moving a multitude of lens carriers into, through and out from the pre-cure station and the curing station. This set of assemblies accomplishes this movement in a completely automated, high speed, mass production basis. In accordance with a third aspect of the invention, the curing station is provided with an intelligent buffer. This buffer allows the lens carriers to accumulate in the curing station, and then discharges the carriers from the station in an ordered manner at the appropriate time. This enables the output or throughput of the curing station to be controlled or adjusted to accommodate changing conditions or circumstances occurring in the manufacturing system downstream of the curing station.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
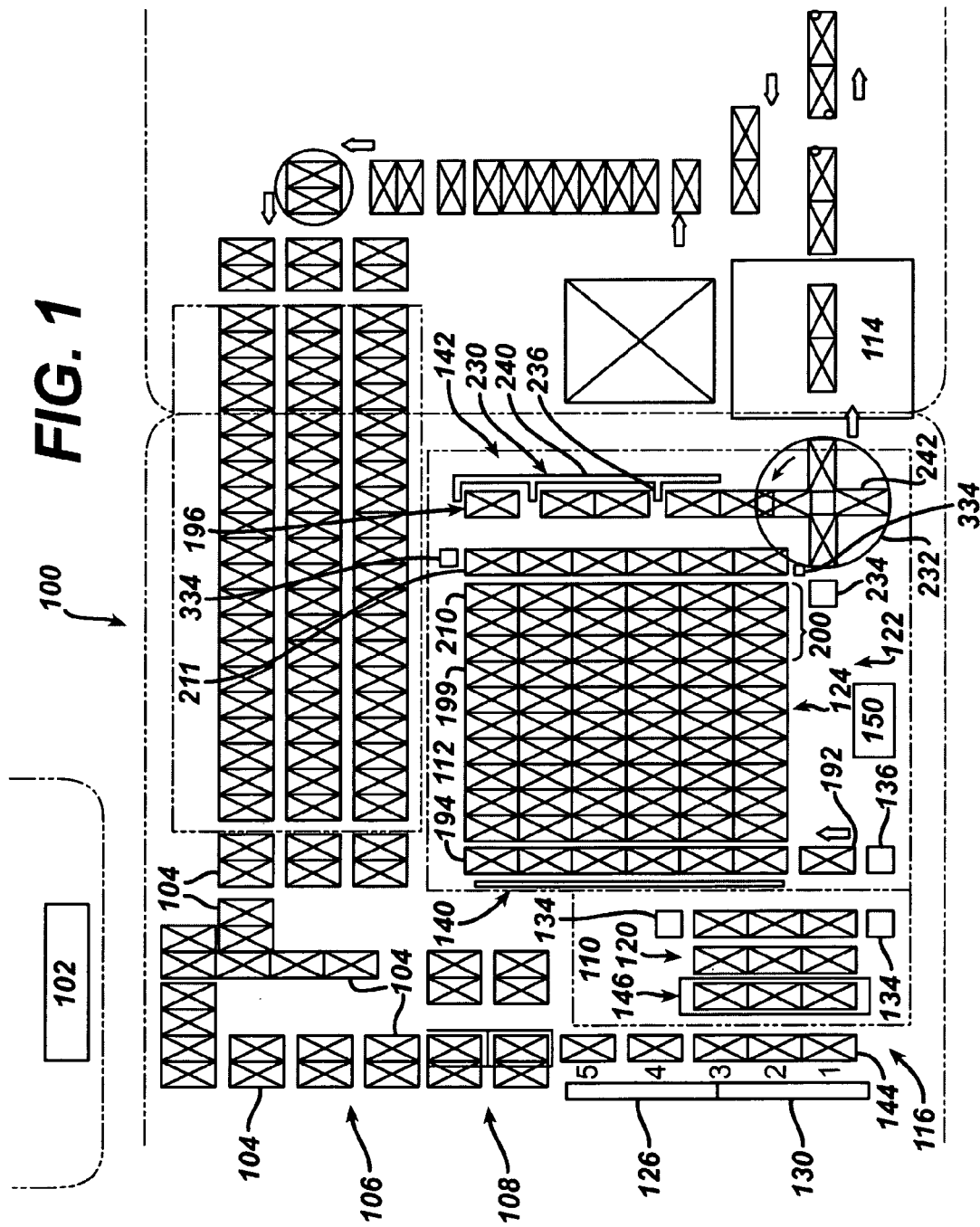
FIG. 1 is a schematic view of a lens molding system embodying this invention.

FIG. 1 generally illustrates a system 100 for manufacturing soft contact lenses from a polymerizable monomer or monomer mixture. The soft contact lenses are formed in a mold assembly having a first concave mold and a second, convex mold half. The mold halves themselves are molded in an injection molding machine, schematically represented at 102, and formed of polystyrene transparent to visible and ultraviolet light. The mold is thin enough to transmit heat rapidly and has sufficient rigidity to withstand prying forces applied to separate the mold halves during demolding.

From the injection molding machine 102, the mold halves are deposited in pallets or carriers 104. In particular, the front mold halves are placed in a first group of carriers, and the second mold halves are placed in a second group of carriers. Each carrier is designed to receive a number, such as eight, of these mold halves; and after receiving the mold halves, these carriers are conveyed from the injection mold area. At a dosing area 106, a polymerizable mixture is then dosed, onto the front curve mold halves; and subsequently, at deposition area 108, the front mold halves are covered with the base mold halves.

The carriers are then conveyed to a pre-cure area 110. The mold halves are clamped together, and the monomer or monomer mixture is then exposed to actinic light, preferably from a UV lamp. At the completion of the pre-cure step, the monomer or monomer mixture has formed a partially polymerized gel, with polymerization initiated throughout the mixture.

Following the pre-cure step, the lens carriers are moved to a UV oven 112 where the monomer/diluent mixture is cured whereby polymerization of the monomer is completed. This irradiation with actinic, visible or ultraviolet radiation produces a polymer diluent mixture in the shape of the final desired hydrogel lens. After the polymerization process is completed, the lens carriers are conveyed to a demolding station 114, where the mold halves are separated, typically leaving the contact lens on the first, or front, mold half, from which it is subsequently removed. The front and base curve mold halves are used for a single lens molding and then discarded or disposed of. After the demolding step, the solvent is displaced with water to produce a hydrated lens. The lenses may be further treated, and are packaged for consumer use.

The present invention provides novel apparatus and methods for moving the lens carriers into, through and from the pre-cure and the curing stations 110 and 112. In its preferred form, the invention comprises first and second sets of article handling devices. The first set 116 of devices is used to form a first array 120 of lens carriers in, and to move that array of carriers through, the pre-cure area 110. The second set 122 of devices is used to form a second array 124 of carriers in, and to move this array of carriers through, the curing area 112.

Figure 7:
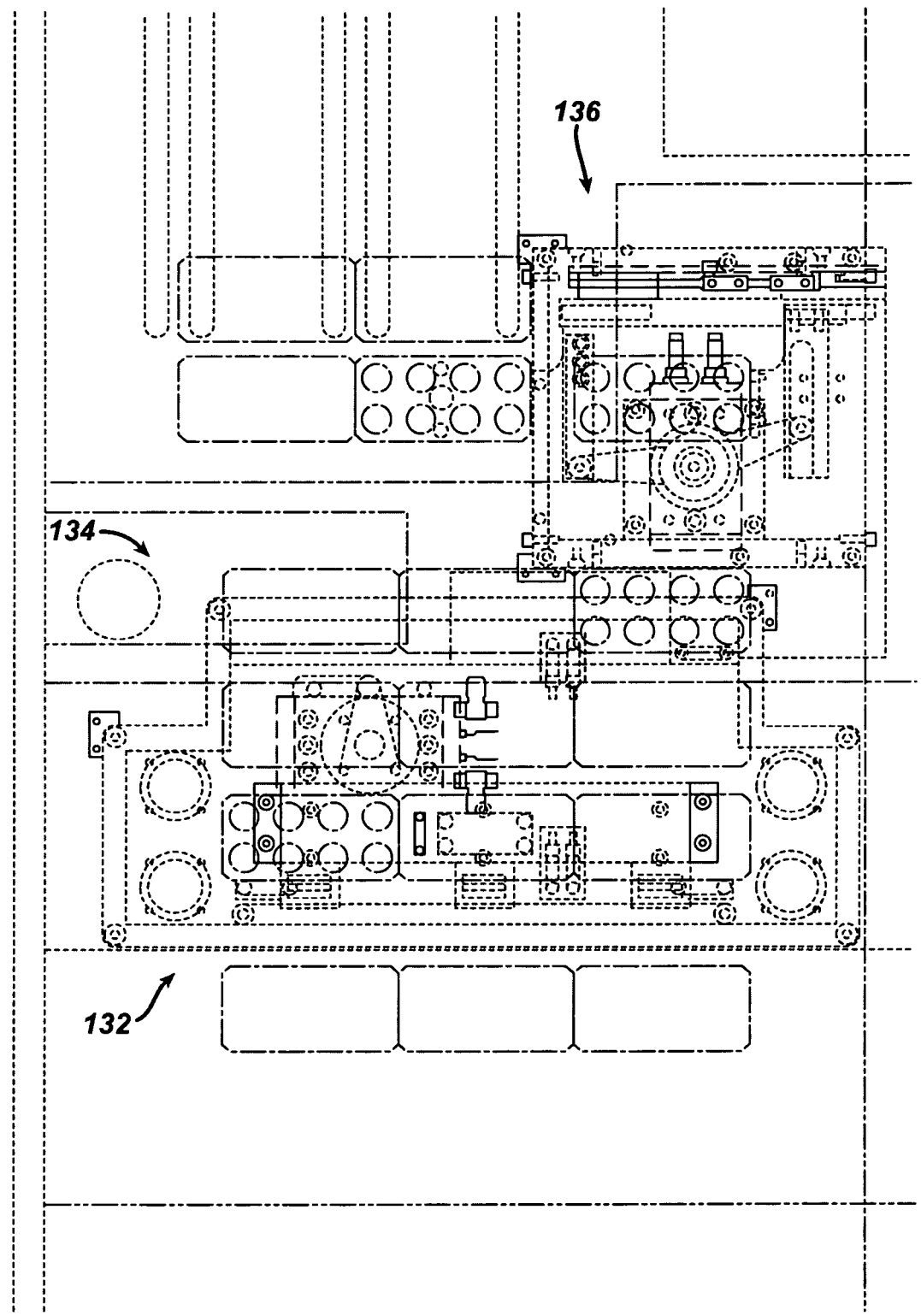
FIG. 7 illustrates assemblies for moving the carriers across the pre-cure station, for discharging the carriers from that station, and for assembling a row of carriers in the curing station.
Figure 8:
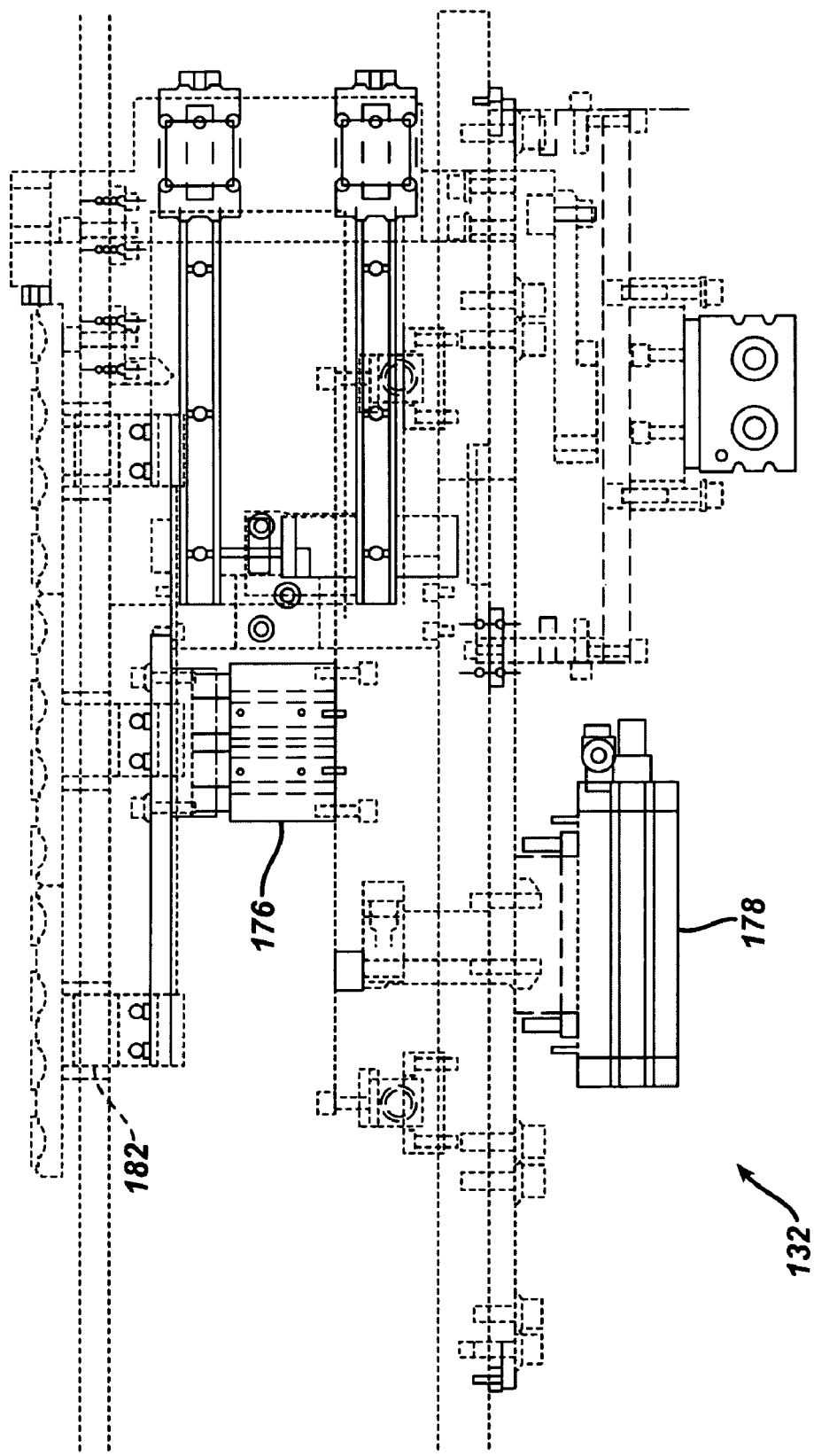
FIGS. 8 and 9 illustrate details of the assembly for moving the carriers across the pre-cure station.
Figure 9:
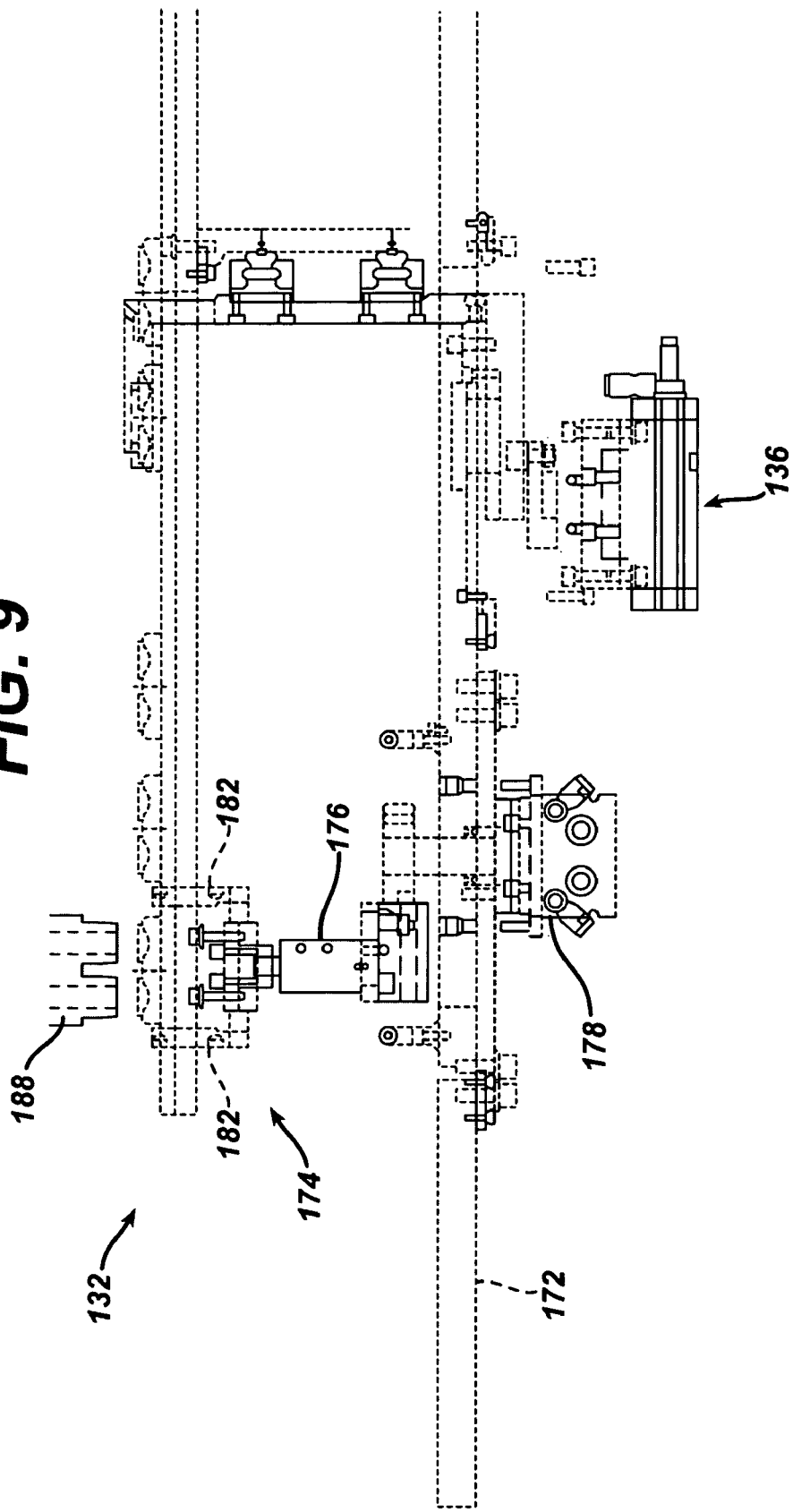

The first set of article handling devices includes assemblies 126, 130, 132 (shown in FIGS. 7–9) and 134; and the second set of article handling devices includes assemblies 136, 140 and 142. Generally, assembly 126 is provided for assembling a group of lens carriers into a row in a first position 144, with neighboring carriers in the row contiguous to each other; and assembly 130 is used to move this row of lens carriers from that first position and into the pre-cure area 110. Assembly 132 is provided for moving the row of carriers across the pre-cure area 110 and into a final row position therein, and assembly 134 is used to move the row of lens carriers from that final position and out of the pre-cure area 110. Assembly 136 is provided for forming a row of lens carriers in a first position 146 in the curing area 112, with neighboring carriers in this row contiguous to each other; assembly 140 is used to move this row of carriers through a sequence of positions in the curing area 112 and to an end position 196 therein; and assembly 142 is provided for moving the carrier in this row out of the curing area 112. Also, control means, schematically represented at 150, may be provided to control and to coordinate operation of the above-identified assemblies.

Figure 4:
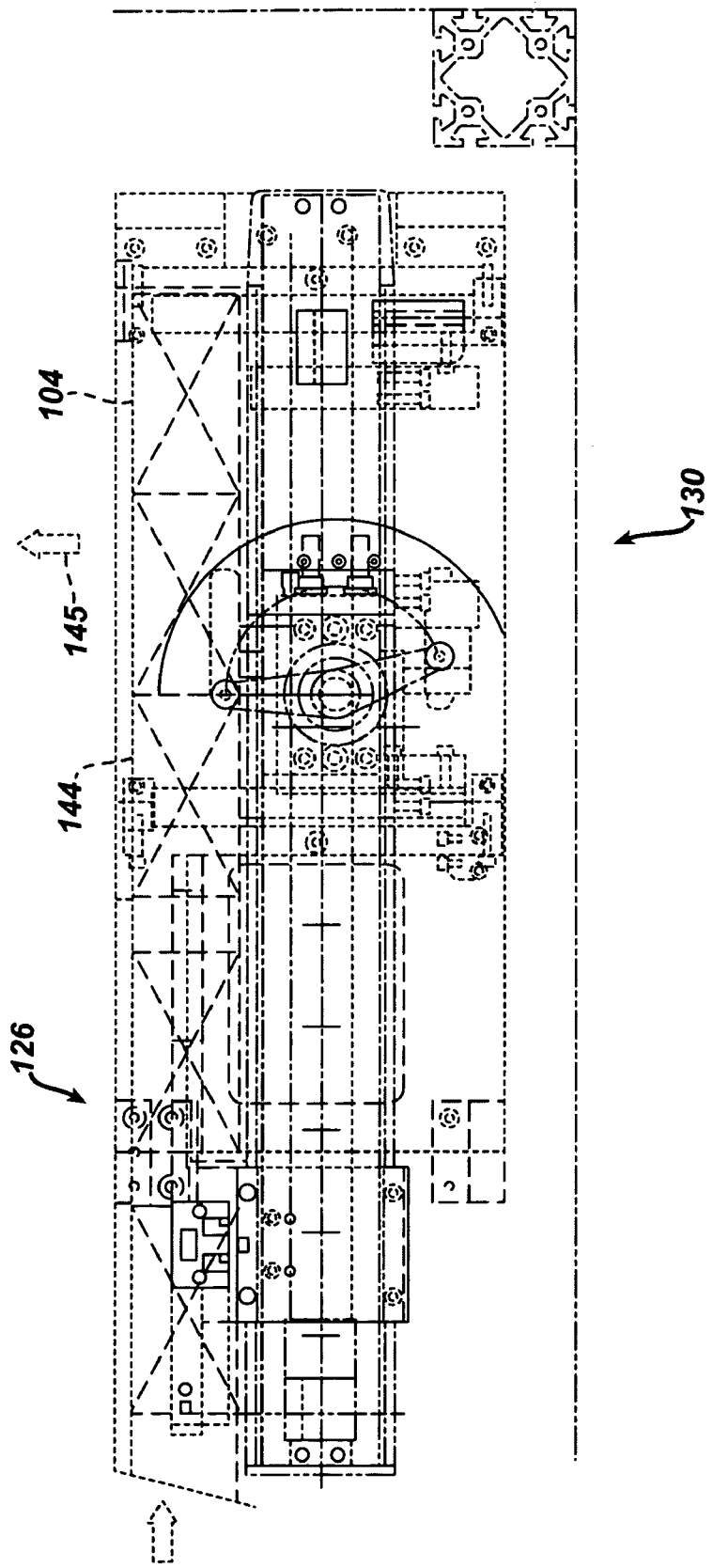
FIGS. 4, 5 and 6 show assemblies for grouping lens carriers and moving groups of carriers into the pre-cure station.
Figure 5:
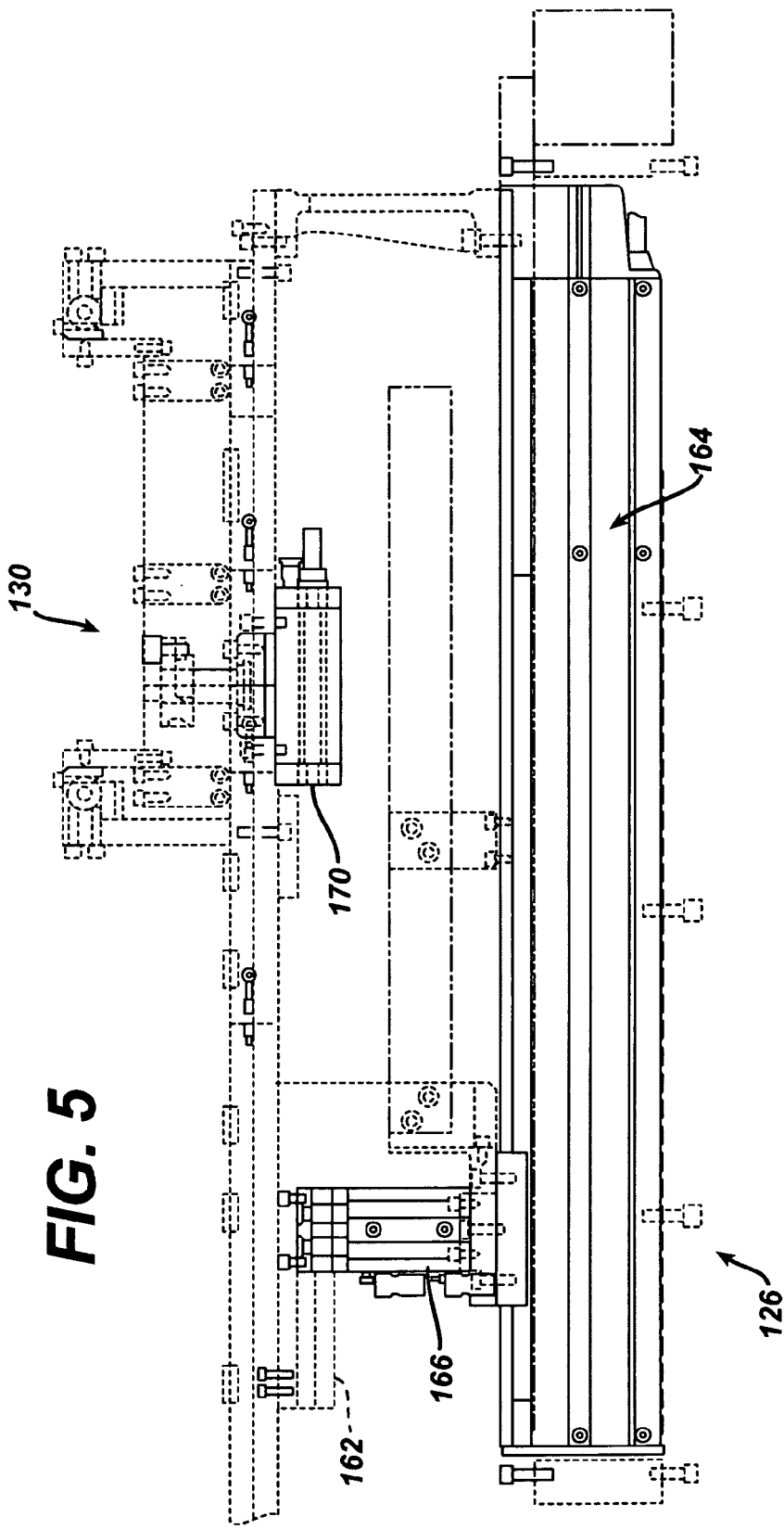

Assembly 126 is shown in greater detail in FIGS. 4 and 5, and with reference thereto, this assembly comprises arm 162, horizontal moving means 164, and vertical moving means 166. Generally, arm 162 is supported for horizontal and vertical movement. Mechanism 164 is used to move that arm between first and second positions to engage lens carriers 104 and to form a group of contiguous lens carriers, and vertical moving means 166 is used to move that arm vertically.

With the embodiment of the invention illustrated in the drawings, assembly 126 is used to form groups of three lens carriers, and each group of three is assembled in a two-step process. In a first step, as lens carriers are moved down by toward the pre-cure area, arm 162 is located just behind (to the top as viewed in FIG. 1) carrier position 5. At this point, two carriers are ahead of the arm, in locations 4 and 5. The arm moves downward, engages the carrier in position 5 and pushes this carrier downward to the carrier position 2. As the arm does this, this lens carrier pushes the carrier ahead of it to carrier position 1. After this is done, the arm 162 returns to a location just behind carrier position 5. The arm is moved to push this lens carrier to position 4. As this occurs, this carrier pushes the lens carrier ahead of it to position 3, abutting against the carrier in position 2, which in turn abuts against the carrier in position 1.

Figure 6:
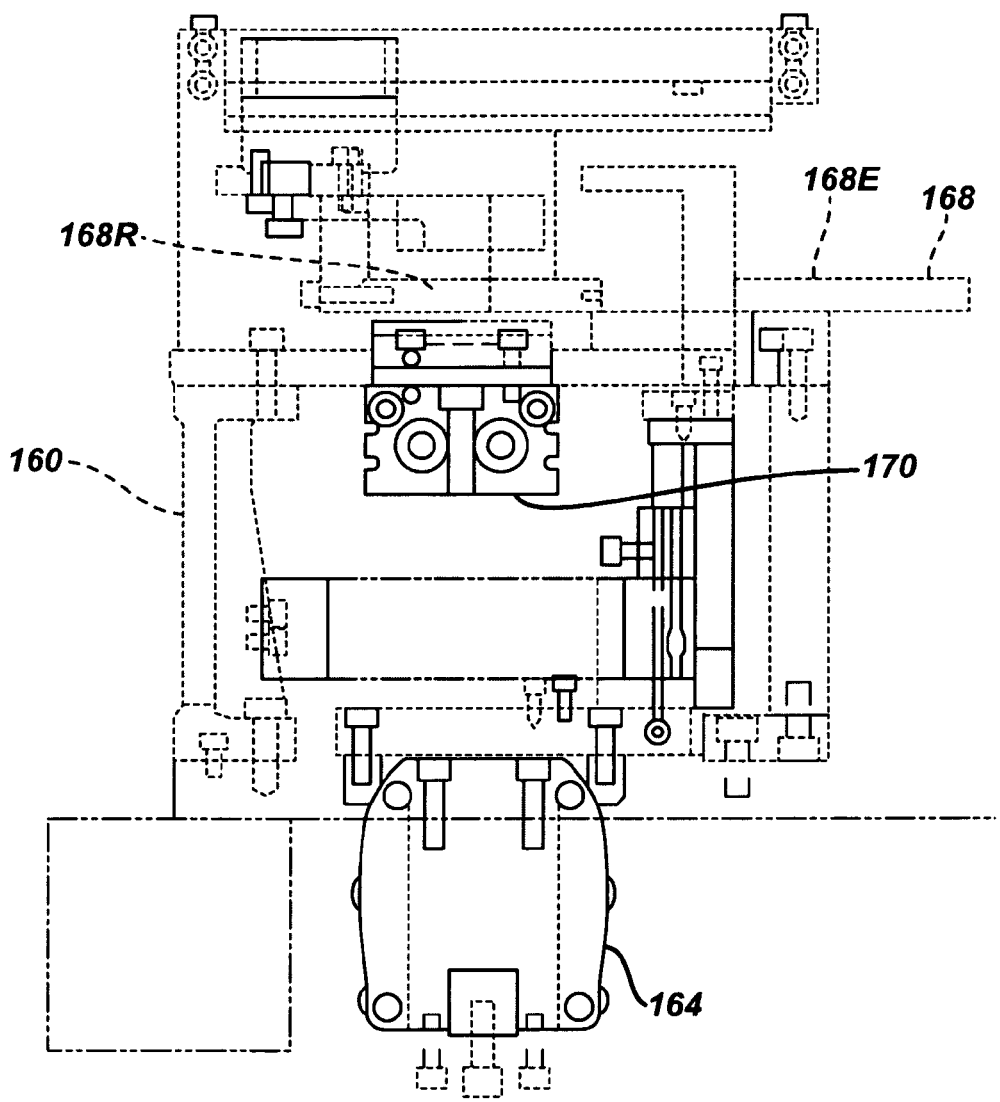

Assembly 130 is used to push this group of carriers 104 into the pre-cure area 110. Assembly 130 is also shown in greater detail in FIGS. 4–6; and as shown therein, the assembly includes support member 160, pusher 168, and moving means 170. Generally, pusher 168 is supported by support member 160 for movement toward and away from the support member, and moving means 170 is provided to move the pusher, relative to the support member, to engage the group of lens carriers, and to push that row of carriers into the pre-cure area. Preferably, the lens carriers are pushed into the pre-cure area as a group, while maintaining the alignment of the carriers and the abutting contact of neighboring carriers.

As will be understood by those skilled in the art, any suitable devices may be used as support member 160, arm 162, pusher 168, and moving means 164 and 170. Also, these devices may be operated in any suitable specific manner.

Once the lens carriers are in the pre-cure area, assembly 132 is used to move the carriers across that area. Assembly 132 is illustrated in detail in FIGS. 7, 8 and 9; and with reference thereto, this assembly comprises support member 172, arm subassembly 174, and moving means 176 and 178. Generally, support member 172 is located below the pre-cure area, and arm subassembly 174 is supported by the support member for horizontal and vertical movement. Also, moving means 176 is operated to move the arm subassembly vertically from a position beneath the pre-cure area, to a position extending above the floor of that area. The moving means 178 is operated to move arm subassembly 174 horizontally, to engage the rows of lens carriers in the pre-cure area and to move those rows across that area and into a final row position therein.

Figure 2:
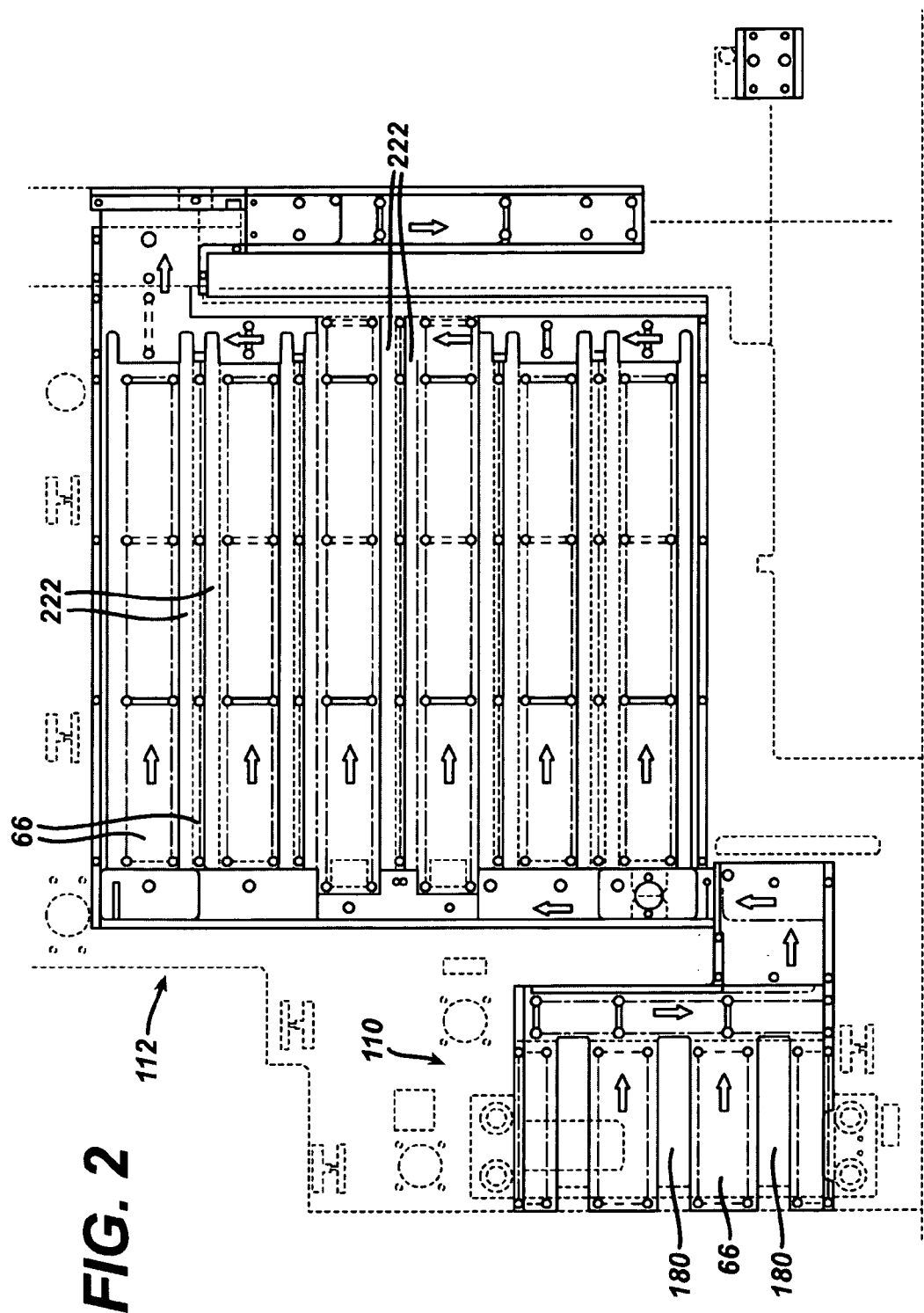
FIG. 2 is a plan view of the pre-cure and curing stations of the lens molding system.
Figure 3:
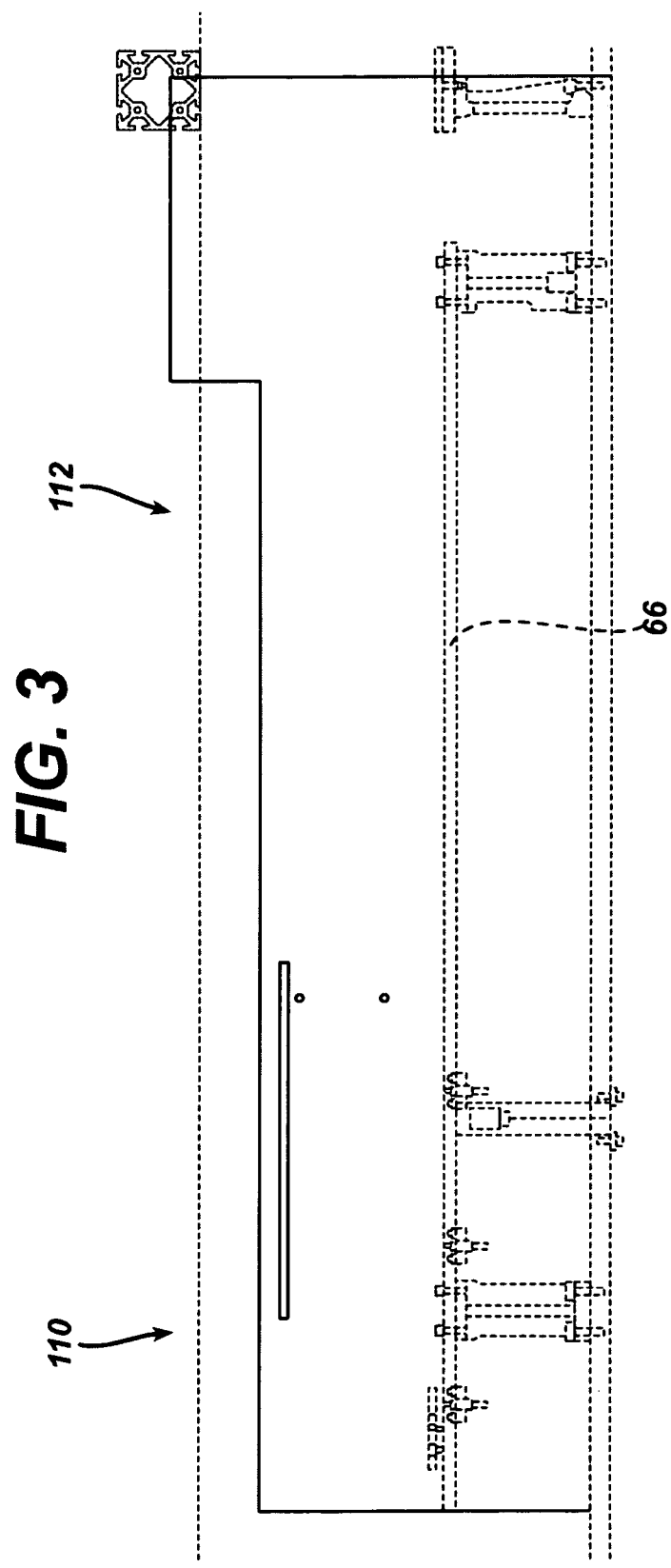
FIG. 3 is a side view of the pre-cure and curing stations.

In order to accommodate the above-described movement of subassembly 174, the floor of pre-cure area is provided with slots 180 (shown in FIG. 2) that allow the subassembly to move from beneath that floor, upward through that floor, then forward, and then back downward, to a position beneath the floor.

Preferably, pre-cure area 10 holds three rows of lens carriers, and assembly 130 is used to move the carriers across the pre-cure area one step at a time, from the first row position, to the second row position and then to the third row position. Moreover, preferably, assembly 130 moves carriers from the first row to the second row at the same time that the assembly moves carriers from the second row to the third row.

To achieve this, arm subassembly may comprise a pair of spaced apart arms or projections 182. These arms 182 are positioned and operated so that these arms move upward together, with one arm moved upward just behind the first row of carriers, and the other arm moved upward just behind the second row of carriers. These arms are then moved horizontally together, with one arm moving one row of carriers from the first row position to the second row position, and the other arm moving one row of carriers from the second row position to the third row position.

Any suitable support member 172, arm subassembly 174 and moving means 176 may be employed in the practice of this invention, and these devices may be operated in any suitable specific manner.

Figure 10:
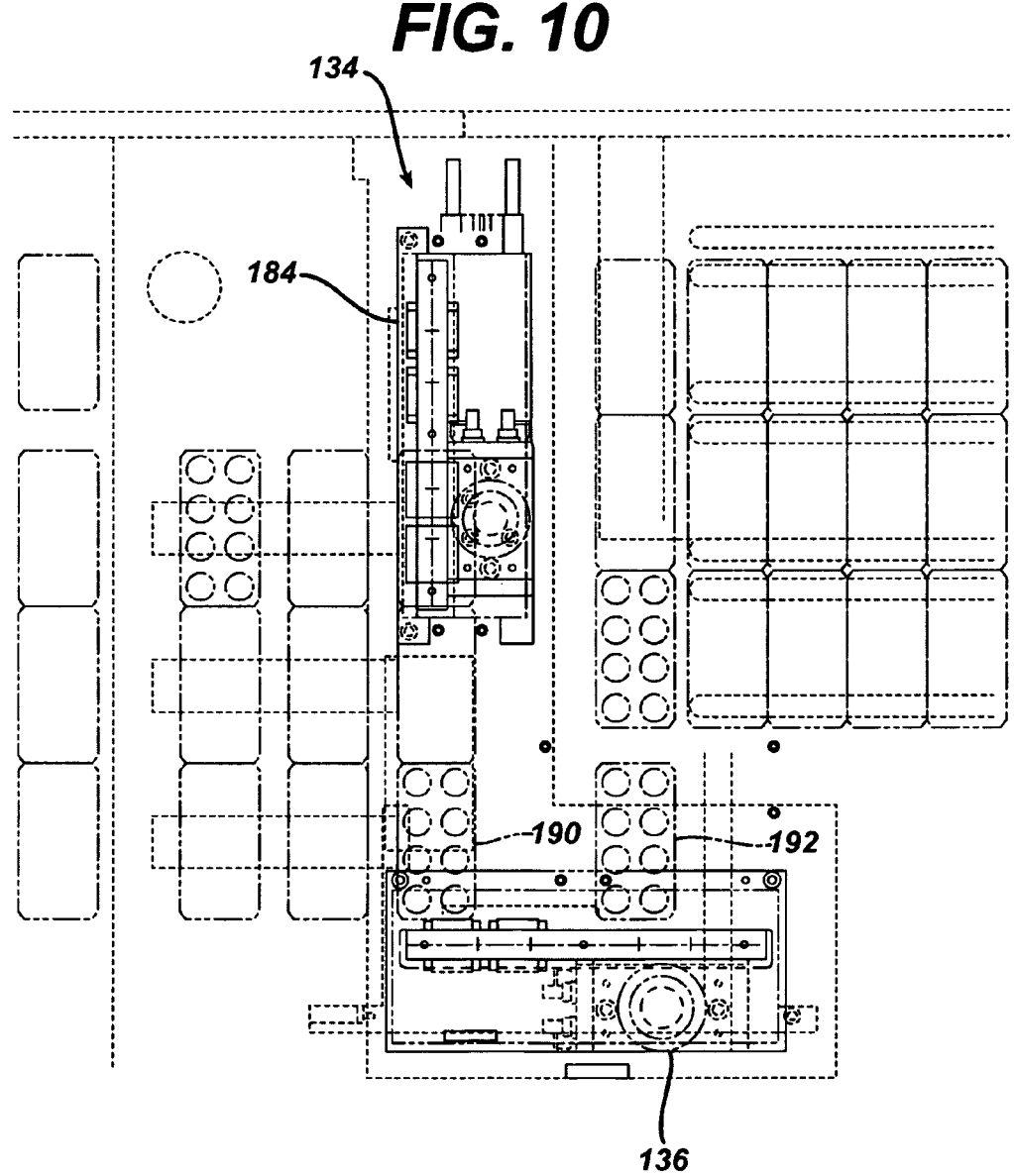
FIGS. 10, 11 and 12 also show the assembly for forming rows of carriers in the curing station, and illustrate an assembly for pushing these rows across that station.
Figure 11:
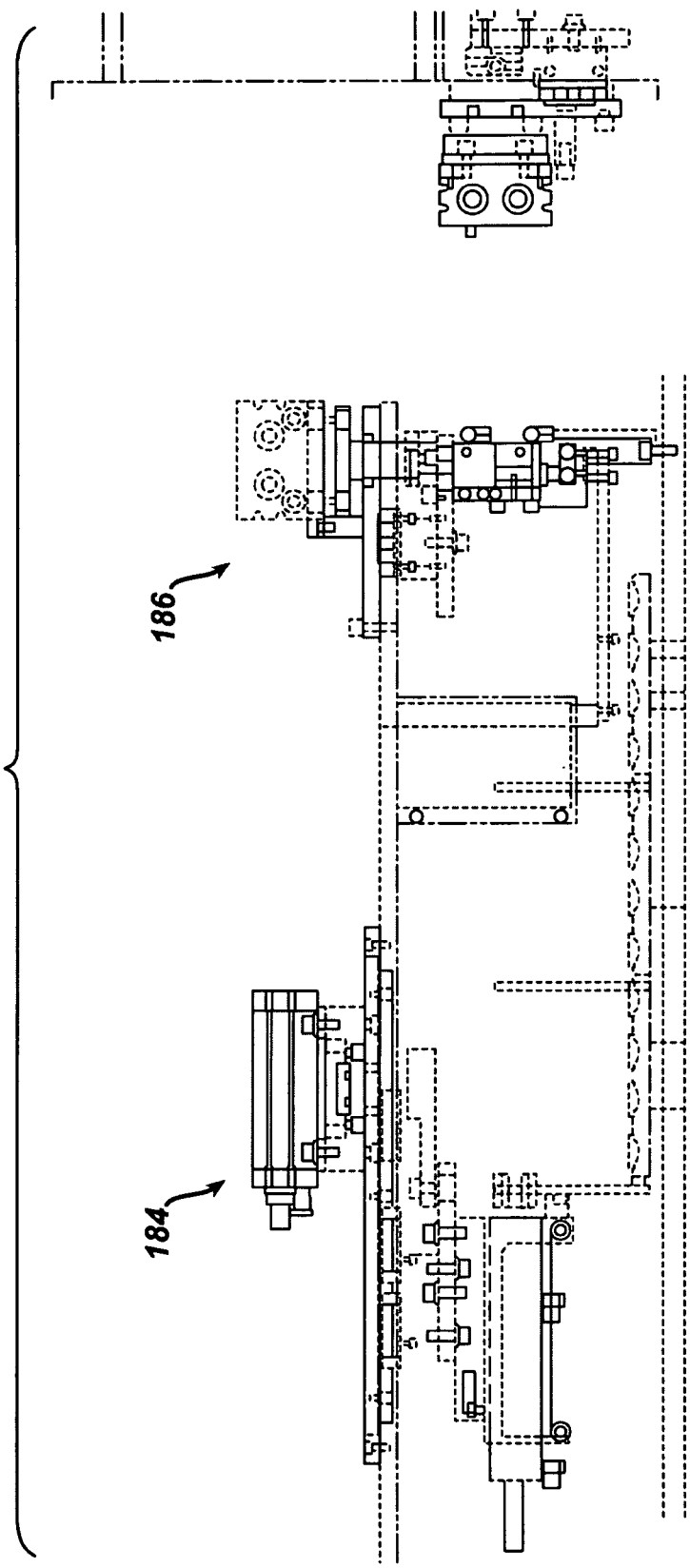
Figure 12:
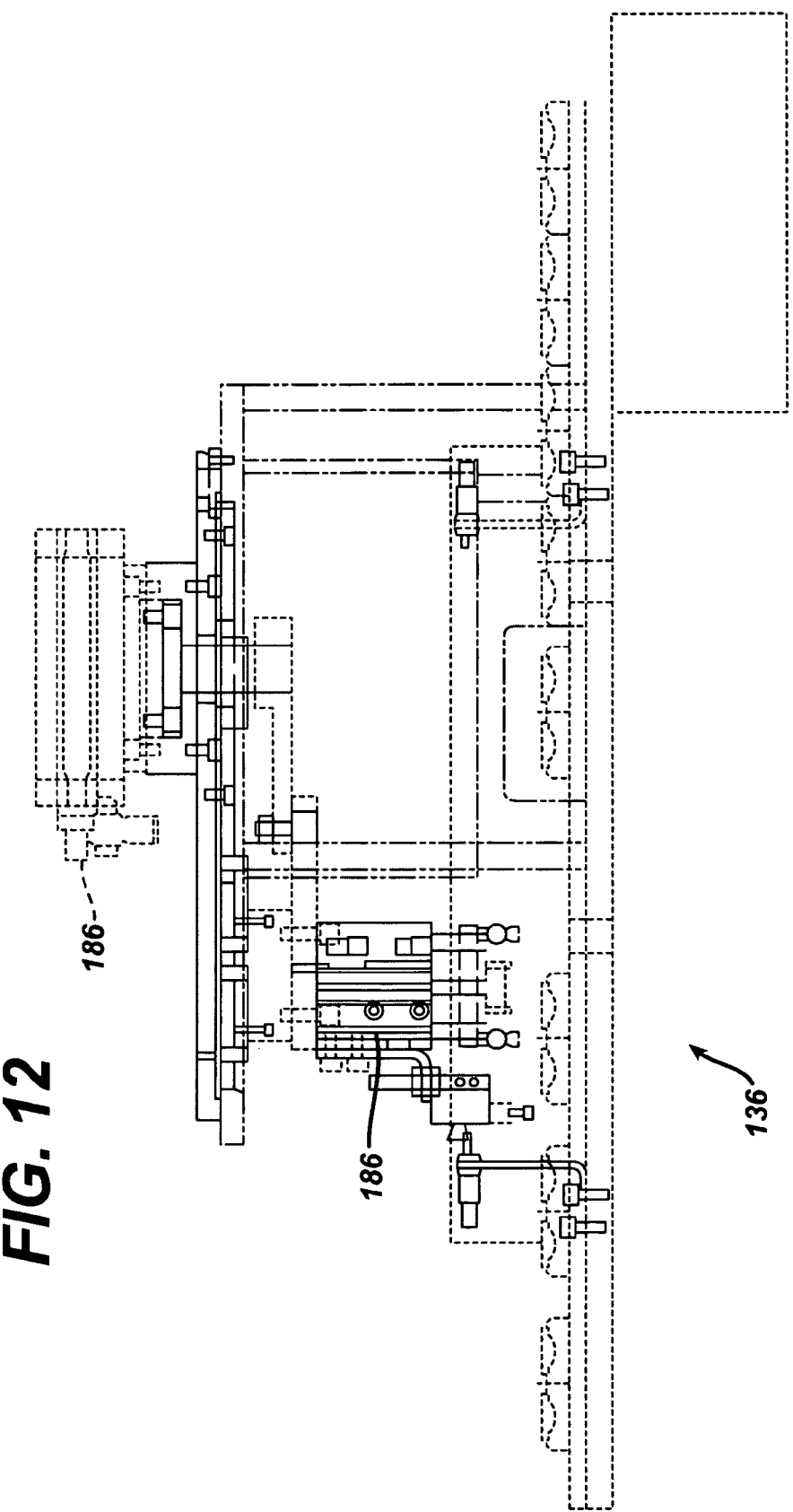

Assembly 134 is provided to move the lens carriers out of the pre-cure area from the final row position. Preferably, with particular reference to FIGS. 10 and 11, this assembly includes first and second engagement means 184 and 186. First engagement means 184 is used to engage the row of lens carriers in the final row position in the pre-cure area, and to move this line of carriers in a first direction so that the carriers in that final row are located, one at a time, in a discharge position 190. With the specific arrangement shown in FIG. 1, this discharge position is the position of the bottom right carrier in the pre-cure area. Second engagement means 186 is used to engage each of the lens carriers in the final row of carriers, one carrier at a time, and to move the carrier from the discharge position and out of the pre-cure area.

Any suitable means may be used as the first and second engagement means 184 and 186. For example, these engagement means may be pneumatic cylinders that are operated to push the carriers in the desired manner. Alternatively, electrically operated pushing or pulling mechanism may also be employed to move the lens carriers in the appropriate way.

Assembly 136 is provided to move the carriers discharged from the pre-cure area into the cure area 112. More specifically, with reference to FIGS. 1 and 10, assembly 136 engages these carriers, one at a time, at a carrier receiving position 192, and moves these carriers in a first direction to form a row of lens carriers in a first row position 194 in the cure area, with neighboring carriers in the row contiguous to each other.

Any suitable specific means may be used to do this. For example, assembly 136 may comprise a pneumatic cylinder, positioned just below the receiving position 192. As carriers are moved from the pre-cure area and into that receiving position, this cylinder may engage these carriers, one at a time, and pushes the carriers upward, into the cure area, to form a row in position 194. After the first carrier is pushed into the row, then, as each subsequent carrier is pushed upward, that subsequent carrier abuts against the previous carrier and pushes that carrier further upward. This process continues until the row of carriers is formed.

As will be appreciated by those of ordinary skill in the art, other specific means may be used to form the carrier rows in the cure area. For instance, electrically operated pushing or pulling devices may be used to form these rows in the cure station.

Assembly 140 is used to move each row of carriers across the curing station 112, from left to right as viewed in FIG. 1, from the first row position to a final row position 196. As this occurs, the rows form array 124, with neighboring rows in the array abutting each other. Preferably, assembly 140 includes support means 202, a pusher subassembly 204, and moving means 206. Pusher subassembly 204 is supported by the support means 202 for movement toward and away from the support means. Moving means 206 is provided to move the pusher subassembly to engage the rows of lens carriers that are formed in row position 194 and to push these rows, one row at a time, forward one step across the cure area. As each row is pushed forward, the row abuts against the row ahead of it and pushes that row forward one step.

With the preferred embodiment of the invention, this process of each row of carriers being pushed across the cure area by the next row, continues until the row reaches the last row position 210 of the array. Then, subassembly 212 is used to move that row of carriers away from array 124. More specifically, subassembly 212 is supported for movement toward and away from that last row position of array 124, and is used to engage the lens carriers in that last row position and to move that row of carriers away from the array.

Figure 13:
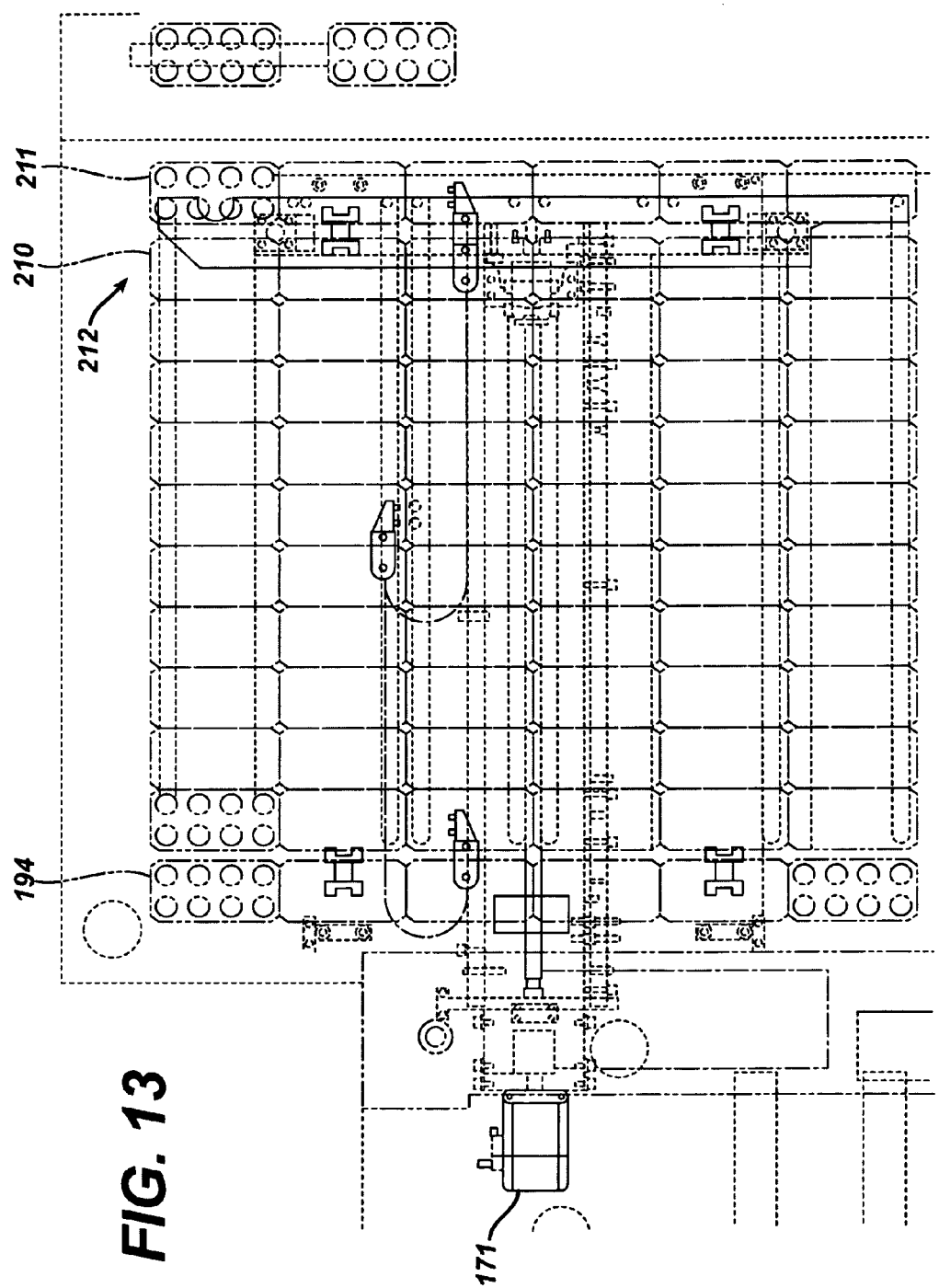
FIGS. 13, 14 and 15 show an assembly for moving a row of carriers to an end position in the curing station.
Figure 14:
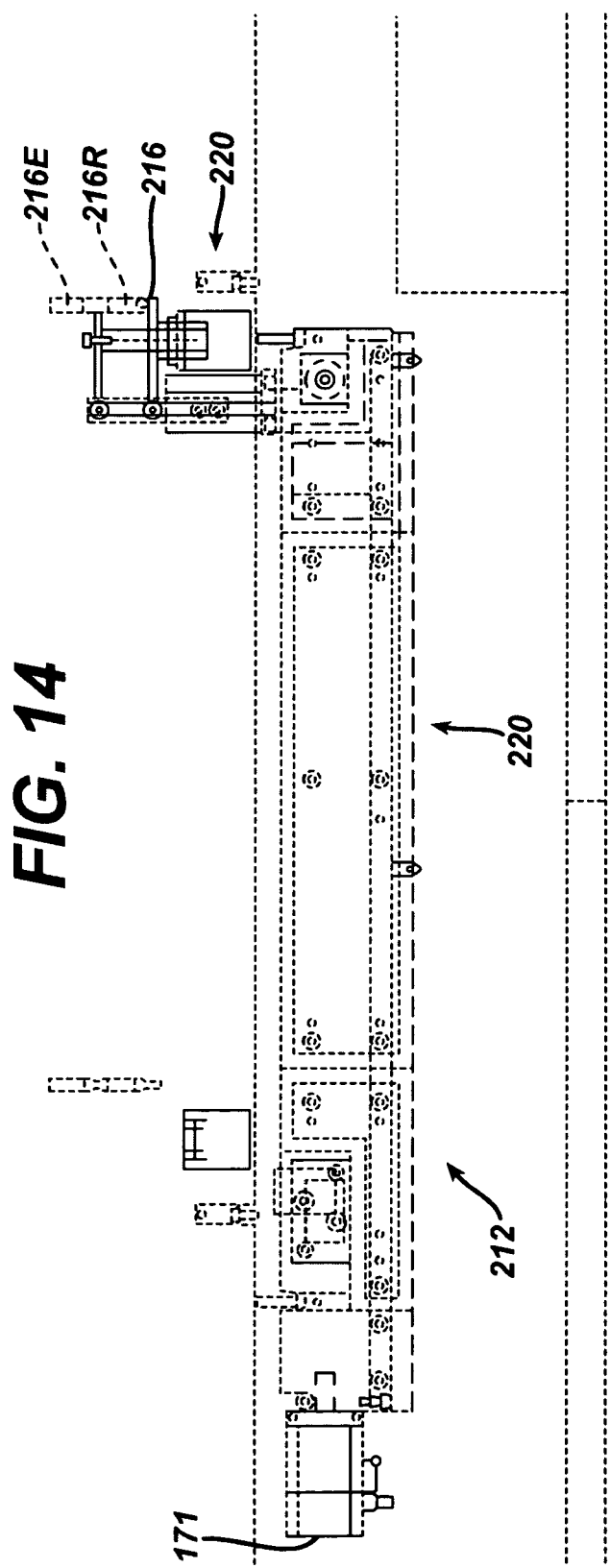
Figure 15:
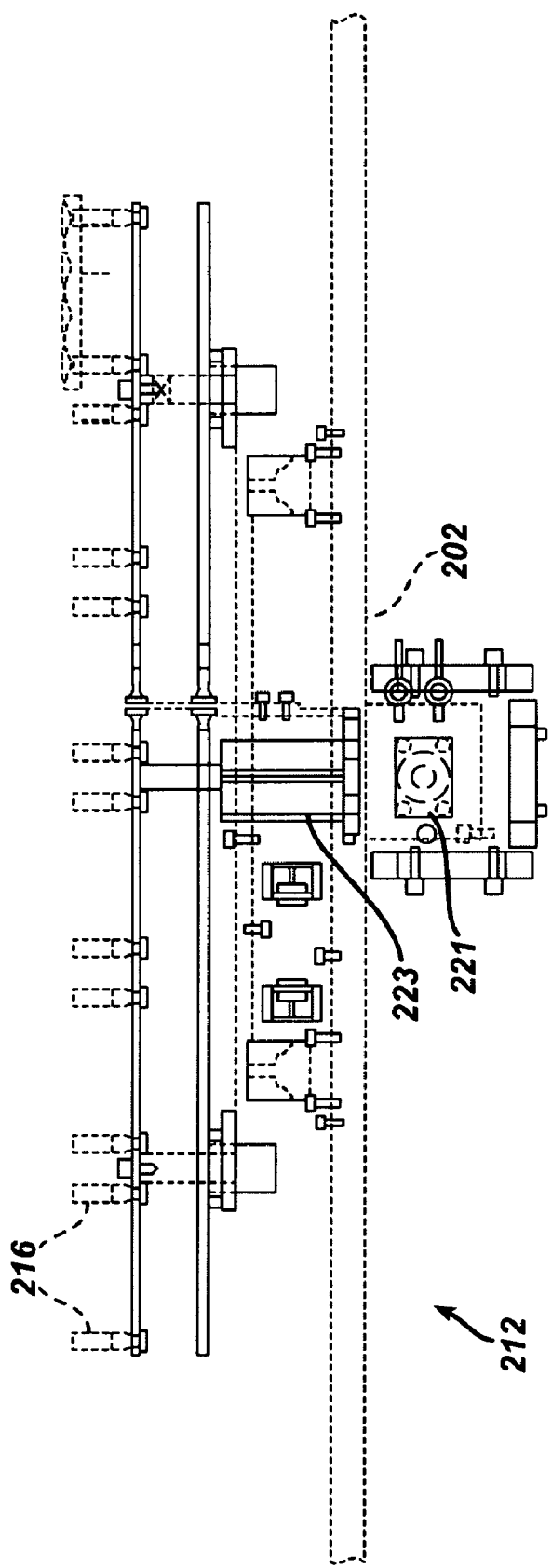

Preferably, with particular reference to FIGS. 13 and 14, subassembly includes a series of engagement members 216 and moving means 220. Engagement members 216 are supported for horizontal movement beneath the curing area and for vertical movement. Moving means 220 are provided to move the engagement members 216 horizontally, beneath the cure area, to positions below the last row of carriers in array 124, then to move the engagement members vertically to engage that row of carriers, and then to move the engagement members horizontally to move the carriers of that last row from array and into a final row position. Once the lens carriers are in the final row position, engagement members 216 are lowered, freeing the lens carriers from the engagement members. Preferably, a respective two engagement members are provided for each lens carrier in each row of array 124; and when a row of carriers is moved away from the array, each lens carrier in that row is engaged and moved, in the above-described manner, by a respective two engagement members.

In order to accommodate the above-describe movement of engagement members 216, the floor of cure station 112 is provided with a series of elongated through slots 222 (shown in FIG. 2) that allow the engagement members to move from beneath that floor, and upward through the floor and into engagement with in carriers of the curing station. These slots also allow the engagement members to then move forward, and then back downward, beneath the floor. With the preferred embodiment of the invention, where a respective two engagement members 216 are provided for each lens carrier in a row of the carriers, the floor of the curing station is provided with a respective two of these elongated slots 222 for each carrier in the row. Thus, for instance, if there are six carriers in a row, preferably, the floor of the curing station is provided with twelve slots. Moreover, preferably, a respective pair of the slots extend directly below a each line of carriers in the array 124.

Any suitable engagement members 216 and moving means 220 may be used in the practice of this invention. For example, the engagement members may be threaded rods mounted on carriers that, in turn, are mounted on rails. The carriers are moved along these rails to move the rods in the horizontal direction, and the rods are rotated to move the rods upwards and downwards. Any suitable means may be used to move the carriers along the rails, and for example, stepper motors may be used to do this.

Preferably, subassembly 212 is able to pull lens carriers from any row position in array 124 to the final row position 196 in the curing station 112. This allows the number of rows in that station to be varied or adjusted over time. This feature, referred to as an intelligent buffer, enables the output of the curing station to be controlled and adjusted to accommodate conditions or circumstances occurring in the manufacturing system 100 downstream of the curing station. For example, if it is appropriate to interrupt the manufacturing system at some point downstream of the curing station, lens carriers can be allowed to accumulate in the curing station. In this way, the processes occurring at and upstream of the curing station can continue uninterrupted and are not affected by the downstream interruption.

In order to achieve this ability, elongated slots 222 extend completely across array 124, preferably all the way to and underneath the first row position 194. Also, elongated members 216 are supported for movement completely across array 124, and can be used to engage lens carriers in any row of the array and to pull that engaged row of carriers to the final row position 196. In addition, with this preferred embodiment, a shield is provided to shield the last several rows of array 124 from the ultraviolet or visible light source in the curing station. With this shield, system 100 has the option of holding lens carriers in those last several rows without overexposing the contact lenses in those carriers to the light source.

With reference again to FIG. 1, once lens carriers are located in the final row position 196, assembly 142 is used to move those carriers out of the curing station. Preferably, assembly 142 includes subassembly 230, receiver 232, and pushing means 234. Receiver 232 is located adjacent the final row position 196, preferably aligned with that row. Subassembly 230 is provided for engaging the lens carriers in that final row position and moving the lens carriers, one at a time, onto the receiver 232. Pushing means 234 is then used to push the lens carrier off the receiver and out of the curing station.

With the embodiment of subassembly 230 shown in the Figures, this subassembly includes a series of beams 236 and moving means 240. Beams 236, referred to as walking beams, are supported for movement along row position 196, to a location adjacent or above receiver 232; and means 240 is provided to move this series of beams across the final row position, to engage the lens carriers therein and to push those lens carriers onto the carrier receiver 232. For example, every other lens carrier may be engaged by one of the beams 236, and that one beam may be used to push two lens carriers onto receiver. Other arrangements may be used, however, in the practice of this invention.

Preferably, receiver 232 forms a defined area 242 for receiving carriers 104. The carriers are pushed into this area by subassembly 230, and then pushed out from this area by pushing means 234. In addition, preferably, receiver 232 is rotatable, and this defined area 242 has the shape of a cross, with each segment of the cross being adapted to receive two lens carriers.

In use, one of these segments is aligned with row position 196, then two lens carriers are pushed onto this segment, the receiver 232 is rotated ninety degrees, and pushing means 234 pushes these two lens carriers off the receiver. As the receiver rotates ninety degrees, the second cross segment becomes aligned with row 196, and subassembly 230 then pushes two more lens carriers onto this segment of the receiver. The receiver rotates another ninety degrees, and pushing means 234 now pushes the two additional carriers off the receiver. This process continues, with the receiver rotating ninety degrees each time two lens carriers are pushed onto the receiver. In this way, the receiver 232 changes the direction of the path of travel of lens carriers by ninety degrees. The carriers that are pushed off the receiver may be pushed onto a conveyer belt or other suitable means for transporting the carriers away from the curing station.

Any suitable beams 236, moving means 240 and receiver 242 may be used in the practice of this invention. For instance, beams 236 may be mounted on an endless conveyor belt that carries the beams through the desired path. Also, a pneumatic cylinder may be used as pushing means 234, although electrically operated pushing or pulling mechanisms may also be used to move the lens carriers from receiver 232.

Control means 150, as mentioned above, are provided to control and to coordinate the operation of the above-discussed article handling devices, and these assemblies may be controlled and operated in any suitable specific manner. For instance, these control means may be used to operate the article handling assemblies according to a defined timing sequence, or sensors may be used to identify when certain events occur or are to occur. Also, a combination of sensors and a defined timing sequence may be used to coordinate operation of the assemblies. For example, in order to facilitate operation of the above-discussed intelligent buffer feature of the curing station, preferably control means is provided with a signal or other information identifying where the last row of lens carriers is located in array 124. With this information, the control means is able to direct subassembly 212 to the proper location the next time that subassembly is activated to move a row of lens carriers from the array 124 and into the final row position.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

The invention claimed is:

1. Article handling apparatus for moving contact lens carriers, around a defined area, comprising:
   a first set of article handling devices for receiving a multitude of contact lens carriers, for forming a first array of lens carriers in said defined area, and for moving said lens carriers into, through, and out of a pre-cure area; and
   a second set of article handling devices for receiving contact lens carriers from said pre-cure area, for forming a second array of lens carriers in a curing area of said defined area, and for moving the lens carriers of said second array through said curing area, wherein the curing area includes an intelligent buffer for accumulating and discharging cured lenses according to variable processing conditions.

2. Apparatus according to claim 1, wherein the first set of article handling devices includes:
   a first assembly for assembling a group of lens carriers in a row in a first position, with neighboring carriers in the row contiguous to each other;
   a second assembly for moving said row of lens carriers from the first position and into the pre-cure area;

a third assembly for moving said row of lens carriers, across the pre-cure area and into a final position therein; and a fourth assembly for moving said row of lens carriers from the final position and out of the pre-cure area.

3. Apparatus according to claim 2, wherein the first assembly includes:

a support member;

an arm mounted on the support member for movement therealong; and means to move the first arm between first and second positions to engage lens carriers and to assemble said group of lens carriers in said row.

4. Apparatus according to claim 2, wherein the second assembly includes:

a support member;

an arm supported by the support member for movement toward and away from the support member; and means to move the arm, relative to the support member, to engage said row of lens carriers in the first position and to push said row of lens carriers from the first position and into the pre-cure area.

5. Apparatus according to claim 2, wherein the third assembly includes:

a support member located below the pre-cure area;

an arm subassembly supported by the support member for horizontal and vertical movement; and means to move the arm subassembly vertically from a position beneath the pre-cure area, to a position extending above the pre-cure area, and to move the arm subassembly horizontally to engage said row of lens carriers in the pre-cure area and to move the row of lens carriers across the pre-cure area and into said final position therein.

6. Apparatus according to claim 2, wherein the fourth assembly includes:

means to engage the row of lens carriers in said final position, and to push the lens carriers of said row in a first direction, wherein the lens carriers of said row are located, one carrier at a time, in a discharge position; and means to engage each of the lens carriers of said row, one carrier at a time, when the lens carrier is in the discharge position and to move the lens carrier out of the pre-cure area.

7. Apparatus according to claim 1, wherein the second set of devices includes:

a first assembly for forming a row of lens carriers in a first position in said curing area, wherein neighboring carriers in the row are contiguous to each other;

a second assembly for moving said row of lens carriers through a sequence of positions in the curing area and to a final position therein; and a third assembly for moving said row of lens carriers out of the curing area.

8. Apparatus according to claim 2, wherein the first assembly includes:

means to engage a plurality of lens carriers, one at a time, in a carrier receiving position, and to move the lens carriers in a first direction to form said row of lens carriers.

9. Apparatus according to claim 7, wherein the second assembly includes:

support means;

a pusher subassembly supported by the support means for movement toward and away from the support means; and means to move the pusher subassembly to engage a plurality of rows of lens carriers, one row at a time, when each of said rows is in the first position in the curing area, and to push the rows across the curing area to form said second array of lens carriers in the curing area, wherein said second array includes a plurality of rows of lens carriers, with neighboring rows in the second array contiguous to each other.

10. Apparatus according to claim 9, wherein:

the second array of lens carriers in the curing area includes a last row of lens carriers in a last row position; and the second assembly includes an engaging subassembly supported for movement toward and away from said last row position, and to engage a row of lens carriers in said last row position and to move said last row of lens carriers away from the second array.

11. Apparatus according to claim 10, wherein the engaging subassembly includes:

a series of engagement members supported for horizontal movement beneath the curing area and for vertical movement; and means to move the engagement members vertically from a position beneath the curing area, to a position engaging the lens carriers in said last row, and to move the engagement members horizontally to move the lens carriers of said last row away from the array and into said final position.

12. Apparatus according to claim 7, wherein the third assembly includes:

a carrier receiver located adjacent the final row position;

a subassembly for engaging the lens carriers in the final row position and moving the lens carriers, one at a time, onto the carrier receiver; and means to push the lens carriers off the carrier receiver and out of the curing area.

13. Apparatus according to claim 12, wherein said subassembly includes:

a series of beams; and means to move said series of beams across the final row position to engage the lens carriers therein and to push the lens carriers onto the carrier receiver.

* * * * *